(12) United States Patent
Haubold et al.

(10) Patent No.: US 7,788,099 B2
(45) Date of Patent: Aug. 31, 2010

(54) METHOD AND APPARATUS FOR QUERY EXPANSION BASED ON MULTIMODAL CROSS-VOCABULARY MAPPING

(75) Inventors: Alexander Haubold, New York, NY (US); Milind R. Naphade, Fishkill, NY (US); Apostol Ivanov Natsev, Harrison, NY (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 11/733,033

(22) Filed: Apr. 9, 2007

(65) Prior Publication Data

US 2008/0250011 A1 Oct. 9, 2008

(51) Int. Cl.
*G10L 21/00* (2006.01)
(52) U.S. Cl. ............... 704/270; 704/9; 704/257
(58) Field of Classification Search ............ 704/270, 704/1, 3, 4, 7, 9, 10, 257, 255; 1/1; 715/500.1
See application file for complete search history.

(56) References Cited

U.S. PATENT DOCUMENTS 6,922,699 B2 * 7/2005 Schuetze et al. ............... 1/1

| | | |
|---|---|---|
| 2003/0018632 A1 | 1/2003 | Bays et al. |
| 2003/0177112 A1 | 9/2003 | Gardner |
| 2004/0167892 A1 | 8/2004 | Kirshenbaum et al. |
| 2004/0267774 A1 | 12/2004 | Lin et al. |
| 2005/0210008 A1 | 9/2005 | Tran et al. |
| 2006/0218481 A1 * | 9/2006 | Adams Jr. et al. ......... 715/500.1 |

\* cited by examiner

*Primary Examiner*—Huyen X. Vo
(74) *Attorney, Agent, or Firm*—Yee & Associates, P.C.; Lisa M. Yamonaco

(57) ABSTRACT

A computer implemented method, apparatus, and computer usable program code for multimodal cross-vocabulary mapping. A corpus of multimodal content is annotated simultaneously using annotations from a plurality of vocabularies to form a set of common annotations. Relationships between a first vocabulary associated with a first modality and a second vocabulary associated with a second modality are identified using the set of common annotations to form a multimodal vocabulary mapping. Items in the first vocabulary associated with the first modality are mapped to items in the second vocabulary associated with the second modality using the multimodal vocabulary mapping.

20 Claims, 9 Drawing Sheets

US 7,788,099 B2

METHOD AND APPARATUS FOR QUERY EXPANSION BASED ON MULTIMODAL CROSS-VOCABULARY MAPPING

BACKGROUND OF THE INVENTION

1. Field of the Invention

The present invention is related generally to a data processing system and in particular to a method and apparatus for information management. More particularly, the present invention is directed to a computer implemented method, apparatus, and computer usable program code for crossmodal cross-vocabulary mapping and application for more effective multimedia content annotation, management, access, presentation, or distribution.

2. Description of the Related Art

Text search and retrieval analysis is a richly exploited area for handling text queries. A query is a request for information from a database or other storage device. A text query is a request for textual information from a database or other storage device containing documents or other textual information. For example, document retrieval is a method of matching a text query against a set of text documents or records to locate text information desired by a user.

Search and retrieval are also vital parts of multimedia content management and are receiving increasing amounts of attention with the growing use of multimedia libraries. Multimedia refers to resources that span multiple modalities, including, but not limited to, audio, video, and text modalities. For example, a resource could include video images of a basketball game and a sound file containing the audio corresponding to the video images.

While the problems associated with text retrieval and text queries are well understood problems with a wide range of effect solutions, search and retrieval of multimedia resources that include a combination of audio, video, and/or text modalities have not been explored to the same degree. A major challenge for multimedia management systems is the gap between the way multimedia content is stored or represented in a computer system and the way users search for it. For example, digital images are typically stored as pixels and are sometimes associated with, or represented by, low-level visual features, such as colors, textures, shapes, etc. While this may enable searching of images by visual similarity to other example images, users are typically more interested in searching by textual keywords or semantic concepts of interest.

In some domains, such as the World Wide Web, images have annotations. Annotations are textual information or metadata associated with an image or other information, such as, without limitation, a title, author, date, and/or description, which enables textual searching of visual content. However, in many other domains, such textual information is not available or is very limited. The limited availability of annotations makes it difficult, if not impossible, for a user to search for images using textual keywords.

Successful multimedia systems require approaches to retrieval of non-textual information, as well as effective fusion of information from different modalities. However, currently available text query and text retrieval methods do not provide a capability to query multimodal documents that have associated text, as well as rich, unstructured multimedia data.

SUMMARY OF THE INVENTION

The illustrative embodiments provide a computer implemented method, apparatus, and computer usable program code for multimodal cross-vocabulary mapping. In one embodiment, a corpus of multimodal content is annotated simultaneously using annotations from a plurality of vocabularies to form a set of common annotations. Relationships between a first vocabulary associated with a first modality and a second vocabulary associated with a second modality are identified using the set of common annotations to form a multimodal vocabulary mapping. Items in the first vocabulary associated with the first modality are mapped to items in the second vocabulary associated with the second modality using the multimodal vocabulary mapping.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
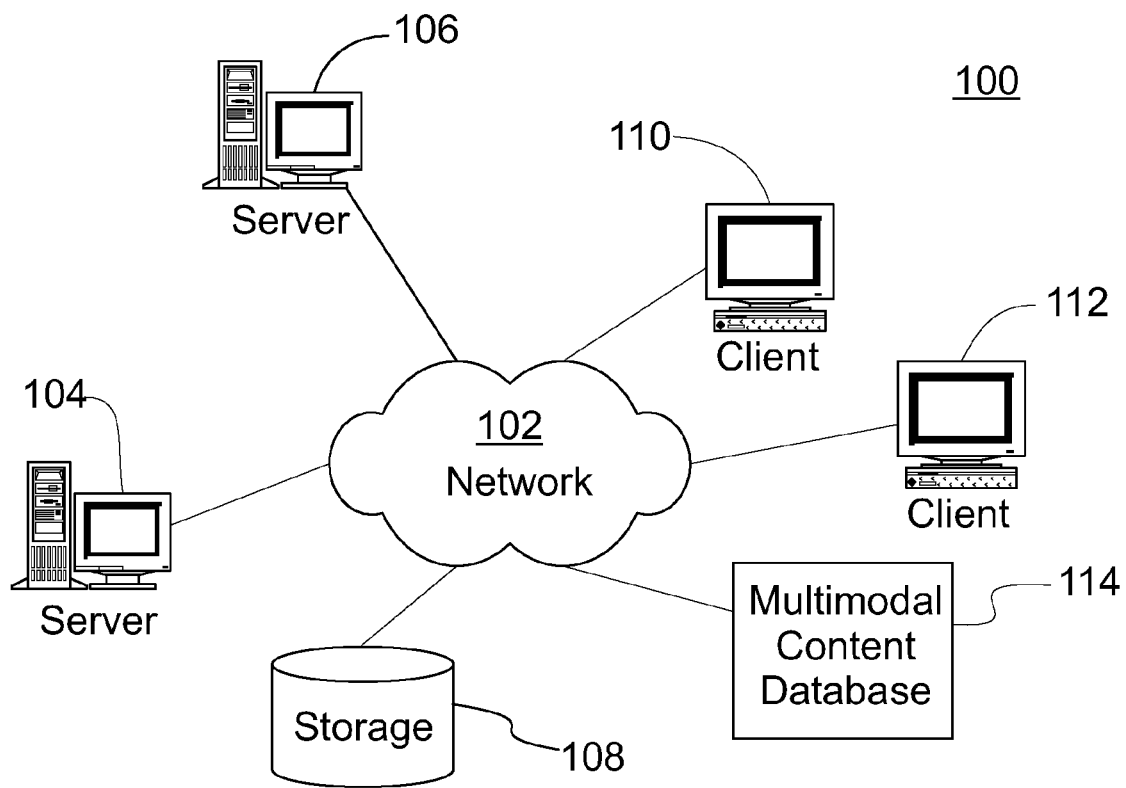
FIG. 1 is a pictorial representation of a network of data processing systems in which illustrative embodiments may be implemented.
Figure 2:
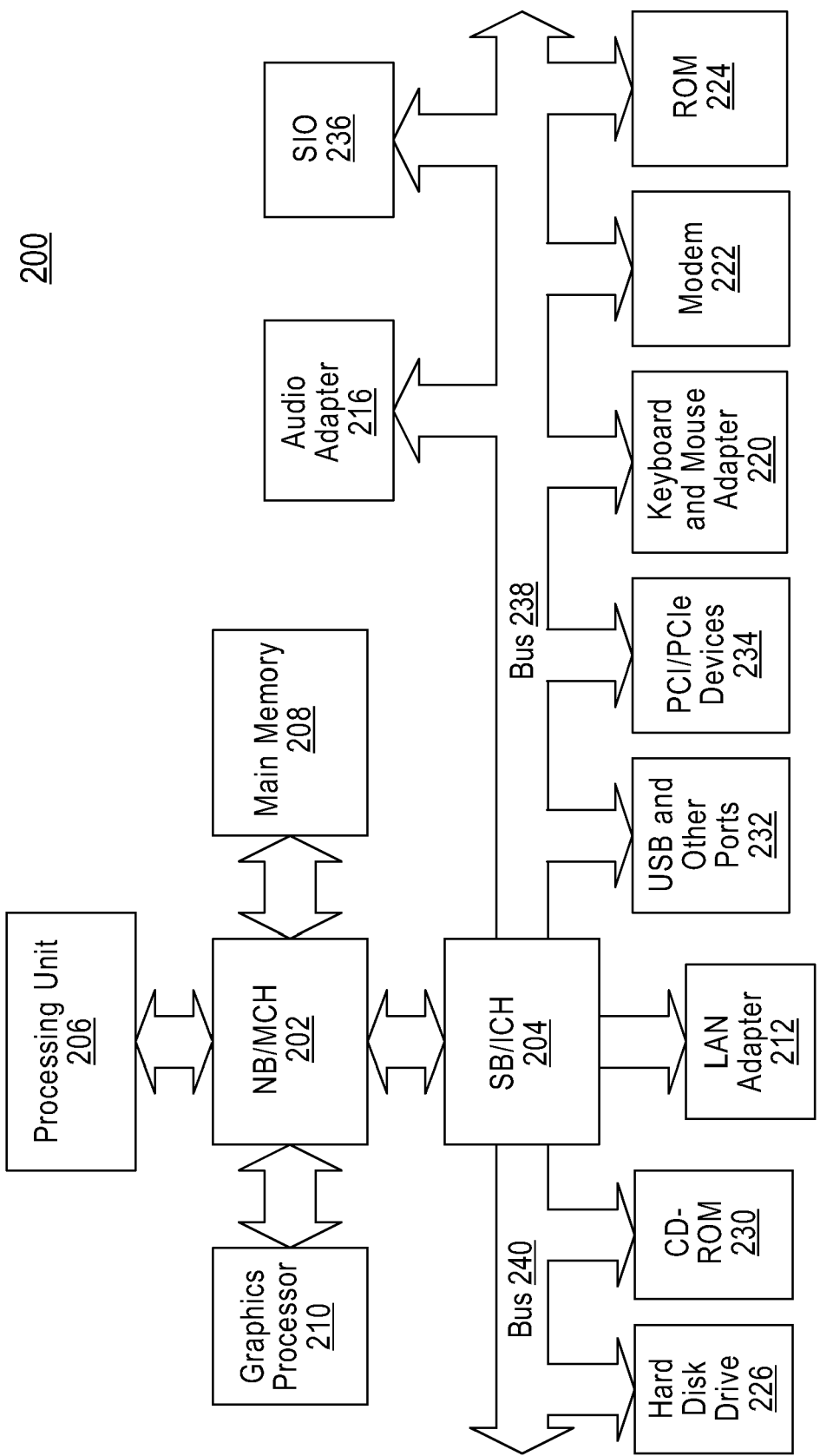
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Multimodal content database 114 also connects to network 102. Multimodal content database 114 is any type of known or available data storage device for storing multimodal, multimedia content. Multimodal content is content that comprises two or more modalities. A modality refers to the type or form of content. For example, a modality may be, without limitation, graphics or image modality, video modality, sound or audio modality, and/or text modality. Multimodal content stored in multimodal content database may include audio content, video content, graphical/image content, and/or textual content. In other words, multimodal, multimedia content spans multiple modalities, including audio modalities, video modalities, and text modalities.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). Network data processing system 100 may include additional servers, clients, data storage devices, databases, and other devices not shown. In addition, FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Text analysis is a richly exploited area for handling text queries. However, currently available text query and text retrieval methods do not provide a capability to query multimodal documents that have associated text, as well as rich, unstructured media. The illustrative embodiments recognize that multimodal concept detection is a recently emerging technology. Current methods of text query and text retrieval do not leverage multimodal concept detection. In other words, current text query and text retrieval methods do not permit a user to leverage a vocabulary of concepts modeled in a modality other than text annotations. In addition, current solutions do not permit a user to leverage a vocabulary for queries using text and another modality combined. The illustrative embodiments recognize that this deficiency in current art could severely limit the capabilities of querying multimodal documents that have associated text, as well as rich unstructured media.

The illustrative embodiments also recognize the need for providing an ability to search content from one modality, such as images or graphics, with query terms from another modality, such as text. Therefore, the illustrative embodiments provide a computer implemented method, apparatus, and computer usable program code for multimodal cross-vocabulary mapping. In one embodiment, a corpus of multimodal content is annotated simultaneously using annotations from a plurality of vocabularies to form a set of common annotations. Annotating simultaneously refers to annotating content in two or more modalities at the same time or within a given time period. In other words, the term "annotated simultaneously" refers to annotating the content in two or more modalities at substantially the same time but does not require the annotation of content in two or more modalities to occur at the exact same instant or precise moment.

Relationships between a first vocabulary associated with a first modality and a second vocabulary associated with a second modality are identified using the set of common annotations to form a multimodal vocabulary mapping. Items in the first vocabulary associated with the first modality are mapped to items in the second vocabulary associated with the second modality using the multimodal vocabulary mapping.

A modality typically refers to a type of sensation, such as sight/vision or sound/hearing. Multimodal content refers to content that spans multiple modalities, such as text, audio, and/or video.

Figure 3:
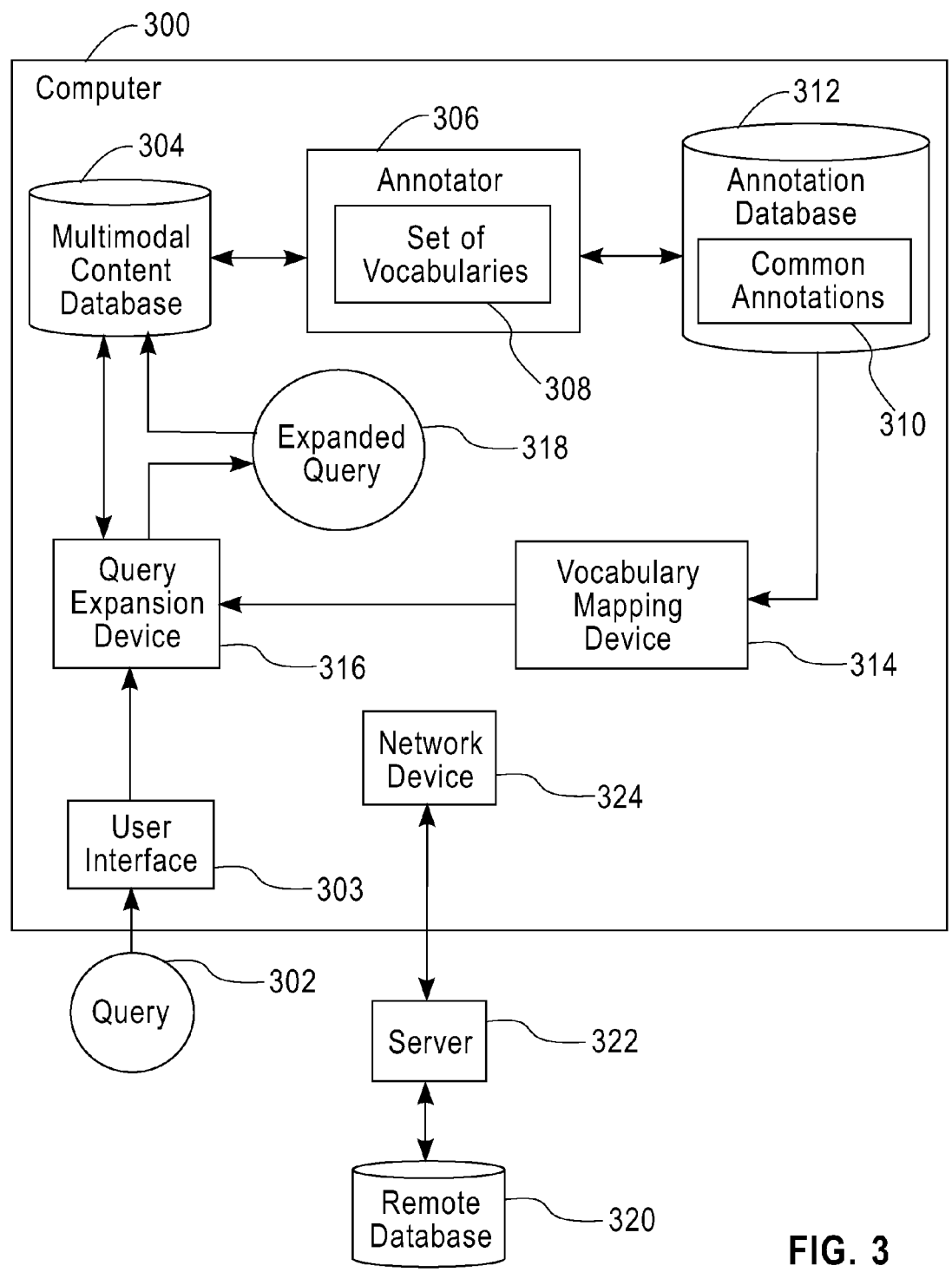
FIG. 3 is a block diagram illustrating a dataflow when a user enters a query to search and retrieve information from a multimodal content database in accordance with an illustrative embodiment.

FIG. 3 is a block diagram illustrating a dataflow when a user enters a query to search and retrieve information from a multimodal content database in accordance with an illustrative embodiment. Computer 300 may be implemented using any type of computing device, such as a personal computer, laptop, personal digital assistant, or any other computing device depicted in FIGS. 1 and 2.

A user enters query 302 into user interface 303 to search for content in multimodal content database 304 desired by the user. Query 302 is a request to search and retrieve information desired by the user. Query 302 may include keywords, search terms, annotations, and/or other items associated with a single modality. In other words, query 302 may include items for a text modality or a graphics modality. However, in this example, query 302 cannot be used to search for items associated with two different modalities.

User interface 303 is a user interface for accessing a database, such as multimodal content database 304. User interface 303 may include any type of known or available interface for providing input to computer 300, permitting a user to enter query 302, and/or access multimodal content database 304. For example, user interface 303 may include, without limitation, a command line interface, a graphical user interface (GUI), a menu driven interface, a mouse, a keyboard, such as an alphanumeric keyboard, a touch screen, a voice recognition system, a speech recognition system, and/or any combination of these types of interfaces.

Multimodal content database 304 is a database or other data storage device for storing multimodal content. Multimodal content includes, but is not limited to, textual information, text documents, audio information, sound files, graphic images, pictures, moving video, or any other type of graphical content. Multimodal content database 304 may also be referred to as a corpus.

Multimodal content database 304 may be implemented as any type of known or available database. In this example, multimodal content database 304 is a database, such as, without limitation, multimodal content database 114 in FIG. 1.

Annotator 306 is a software component for annotating the corpus of multimodal content in multimodal content database 304 and each vocabulary in set of vocabularies 308. Annotator 306 may also be referred to as a concept detector. Annotator 306 produces a stream of metadata about content in a given modality. For example, annotator 306 may produce a stream of annotation data about an image. The image could be an image of people playing basketball. The annotation data produced by annotator 306 is data about the image, such as, keywords, terms, descriptors, objects, or tags. The annotation data can be used to locate content, such as images, text, or audio information that corresponds to query data entered by a user in query 302.

Annotator 306 includes set of vocabularies 308. Set of vocabularies is a set of two or more different vocabularies. Each vocabulary in set of vocabularies 308 is associated with a corresponding different modality. For example, set of vocabularies 308 may include a text vocabulary associated with a text modality, an audio/sound vocabulary associated with an audio/sound modality, and/or an image vocabulary associated with a graphics/image modality. The vocabulary can be explicitly pre-defined. For example, a pre-defined vocabulary may be, without limitation, a fixed set of sounds. The vocabulary may be an implied vocabulary. For example, an implied vocabulary may be, without limitation, the set of words in the English language or any other language. The vocabulary may be a computer-generated vocabulary and/or a user-generated vocabulary. For example, a computer-generated or user-generated vocabulary may be, but is not limited to, a set of visually coherent patterns with distinct semantic interpretations, such as indoor/outdoor scenes, sky, and/or water.

Common annotations 310 are annotations associated with a corpus of multimodal content. Common annotations 310 are stored in a data storage device, such as annotation database 312. Annotation database 312 is a data storage device for storing annotation data, such as common annotations 310. Annotation database 312 may be implemented as any type of known or available database. In this example, annotation database 312 is a relational database.

Vocabulary mapping device 314 is a software component for learning cross-modal, cross-vocabulary mapping of a plurality of relationships. Vocabulary mapping device 314 identifies various relationships between annotations associated with two or more different modalities on the corpus of multimodal content. Vocabulary mapping device 314 then creates a mapping of the annotations for each modality with the annotations of one or more other different modalities.

The mapping is an association of annotations in modalities with annotations in one or more different modality. The mapping identifies annotations in different modalities that are related or referencing related materials, subject matter, and/or content. For example, a first annotation in a graphical modality indicating graphical or video content of a basketball game scoreboard indicating a change in a score displayed on the scoreboard may be related to a second annotation in an audio modality indicating audio content of a ding sound made by the scoreboard when the score changes. Vocabulary mapping device 314 identifies the first annotation for the graphical modality content as related to the second annotation for the sound modality content. Vocabulary mapping device 314 maps the first annotation in the graphical modality to the second annotation in the sound modality to generate common annotations 310. Thus, common annotations 310 include annotations for multiple different modalities associated with a common corpus of multimodal content in multimodal content database 304. Vocabulary mapping device 314 identifies relationships between the annotations in common annotations 310 for a given modality with the annotations in common annotations 310 associated with one or more other different modalities.

For example, vocabulary mapping device 314 can learn relationships between annotations for graphics of basketball games with annotations for audio modalities related to basketball games.

Query expansion device 316 is a software component for expanding a query or a set of terms provided in one vocabulary and its corresponding modality into a refined query term set which includes mapped entities from a different vocabulary associated with a different modality. Query expansion device 316 uses the cross-modal vocabulary mapping generated by vocabulary mapping device 314 to generate expanded query 318.

Expanded query 318 is query 302 with expanded keywords and/or search terms added to query 302. Expanded query 318 may be used to search multimodal multimedia content in multimodal content database using a single search query, as opposed to using a separate search for each type of information modality a user desired to be included in a search and retrieval operation.

Thus, given any query containing text or multimodal exemplars, query expansion device 316 consults the text vocabulary, one or more multimodal vocabularies different than the text vocabulary, and the cross-modal vocabulary mapping to create an expanded set of terms for querying the corpus of multimodal content which is to be searched. A multimodal exemplar is an example of content that is desired by a user. For example, in a graphics modality, a multimodal exemplar could be an image of a basketball if a user is searching for multimodal content related to basketballs.

In this example, multimodal content database 304 and annotation database 312 are located on or locally to computer 300. However, multimodal content database 304 and annotation database 312 may also be located remotely to computer 300. For example, remote database 320 is any type of database for storing a collection of data that is not located on computer 300. Remote database 320 may be a database for storing multimodal content, such as multimodal content database 304 and/or annotation data, such as annotation database 312. In this illustrative example, remote database 320 is located on server 322.

Server 322 is any type of server, such as, without limitation, server 104 and 106 in FIG. 1. Server 322 can be a server on a network, such as network 102 described in FIG. 1. Computer 300 accesses remote database 320 on server 322 through a network connection via network device 324.

Network device 324 is any type of network access software known or available for allowing computer 300 to access a network. Network device 324 connects to a network connection, such as network 102 in FIG. 1. The network connection permits access to any type of network, such as a local area network (LAN), a wide area network (WAN), an Ethernet, an intranet, or the Internet.

Thus, in this illustrative embodiment, a user enters query 302 to search and retrieve content in multimodal content database 304. The user enters query 302 at user interface 303 of computer 300. Annotator 306 annotates a common training corpus of multimedia, multimodal content in multimodal content database 304 using annotations from set of vocabularies 308. Each vocabulary in set of vocabularies 308 is associated with a different modality.

Annotator 306 annotates the corpus of multimodal content automatically or semi-automatically to form common annotations 310. Annotator 306 may annotate the corpus of multimodal content to generate common annotations 310 that are assumed, implicit, or extracted automatically without human intervention. Annotator 306 generates common annotations 310 using a vocabulary in set of vocabularies 308 for each modality associated with content in multimodal content database. In other words, annotator 306 uses terms from each vocabulary in set of vocabularies 308 to annotate the corpus of multimodal content in multimodal content database 304. In another embodiment, a user may annotate the corpus of multimodal content to generate common annotations 310 in whole, or in part. In other words, annotator 306 may generate all of common annotations 310, a user may generate all of common annotations 310, and/or a user may generate part of common annotations 310 and annotator 306 may automatically generate part of common annotations 310 without user intervention.

The quantum unit which is annotated with the vocabularies in set of vocabularies 308 could be a page in a hypertext markup language (HTML) document, a shot or a story in a video document, a video frame, an image, or an image region. In this manner, annotator 306 annotates different modalities of multimodal content in multimodal content database 304 with terms from the corresponding vocabularies in set of vocabularies 308. For example, a particular piece of multimodal content, such as, without limitation, a video segment of a basketball game, may be annotated with textual annotations appearing in the speech track, such as, but not limited to, annotations in the form of the words "basketball" and/or "score", with audio sounds as well as with key visual frames. The audio sounds in this example, may be, but are not limited to, crowd applause and/or a buzzer sound. The key visual frames may be, without limitation, frames showing the basketball going through the hoop. In this example, the annotations come from three different vocabularies, each having a different modality, such as, without limitation, text, audio, and images.

Vocabulary mapping device 314 learns relationships between annotations. Vocabulary mapping device 314 learns the cross-vocabulary or cross ontology mapping using supervised or unsupervised methods. With supervised methods, the vocabulary mapping device may be trained in advance to recognize only certain kinds of relationships, such as "X is a kind of Y", "X is part of Y", "X is related to Y", or any other kind of relationship. With unsupervised methods, the vocabulary mapping device may discover any kind of relationship that exists in the data, including lexical relationships, such as synonyms, semantic relationships, such as, without limitation, basketball is a sport, statistical relationships, such as, but without limitation, Michael Jordan is related to basketball. Other lexical relationships, semantic relationships, and/or statistical relationships may also be discovered in accordance with the illustrative embodiments.

For example, in the basketball setting, the vocabulary mapping device may learn a relationship between the words "basketball score", the sounds of a crowd applause, and the visuals of a basketball going through the hoop. In a preferred embodiment, the relationship may be inferred from the frequent co-occurrence of related words, sounds, and visuals through methods such as feature selection, correlation analysis, and statistical inference.

Vocabulary mapping device 314 generates cross-modal vocabulary mapping. Cross-modal vocabulary mapping is the mapping of relationships between annotations in common annotations 310. In other words, vocabulary mapping device 314 builds explicit links between items in different vocabularies based on, for example, the frequency that annotations or markers associated with an item in one vocabulary corresponds to annotations associated with an item in a different vocabulary.

Query expansion device 316 generates expanded query 318 using the cross-modal vocabulary mapping to add additional keywords and search terms to query 302. Query expansion device 316 uses cross vocabulary mapping in conjunction with any current state of the art techniques of query expansion that takes a query having a set of keywords and expands the set of keywords further to include multimodal lexical entries. For example, given a query for "basketball highlights", the query expansion device may add additional related query terms from different modalities, such as the word "score", the audio concept of "crowd applause", and the visual concept of "basketball hoop".

The keywords and search terms added to query 302 are keywords, search terms, annotations, metadata, markers, and other items describing content of a given modality. The keywords and search terms to be added to the query are identified by mapping keywords in query 302 with linked keywords in one or more different vocabularies. These linked keywords are included in query 302. Thus, expanded query 318 includes keywords, search terms, annotations, and other items, such as, but without limitation, sounds, colors, shapes, textures, edges, and/or motion patterns, associated with vocabularies for two or more different modalities of the corpus of common multimodal content. Expanded query 318 can simultaneously retrieve content associated with two or more different modalities in response to user's query 302, which only included search terms, keywords, annotations, or other items associated with a single modality.

In this example, annotator 306 is a software component for automatically annotating content in multimodal content database 304 without human intervention and/or participation in the annotation process. However, in another embodiment, one or more human users annotate all or part of the content in multimodal content database 304 manually. In addition, annotator 306 is a single annotator. However, in another embodiment, computer 300 may include two or more annotators. In other words, annotator 306 may be a manual or semi-automatic annotation tool. Likewise, annotator 306 may be a different and separate annotation tool for each vocabulary in set of vocabularies 308. For example, for the vocabulary associated with a text modality, annotator 306 uses a text transcript. For a vocabulary associated with a document containing spoken words or other audio content, an automatic speech recognition device can convert the audio content into a text transcript.

Figure 4:
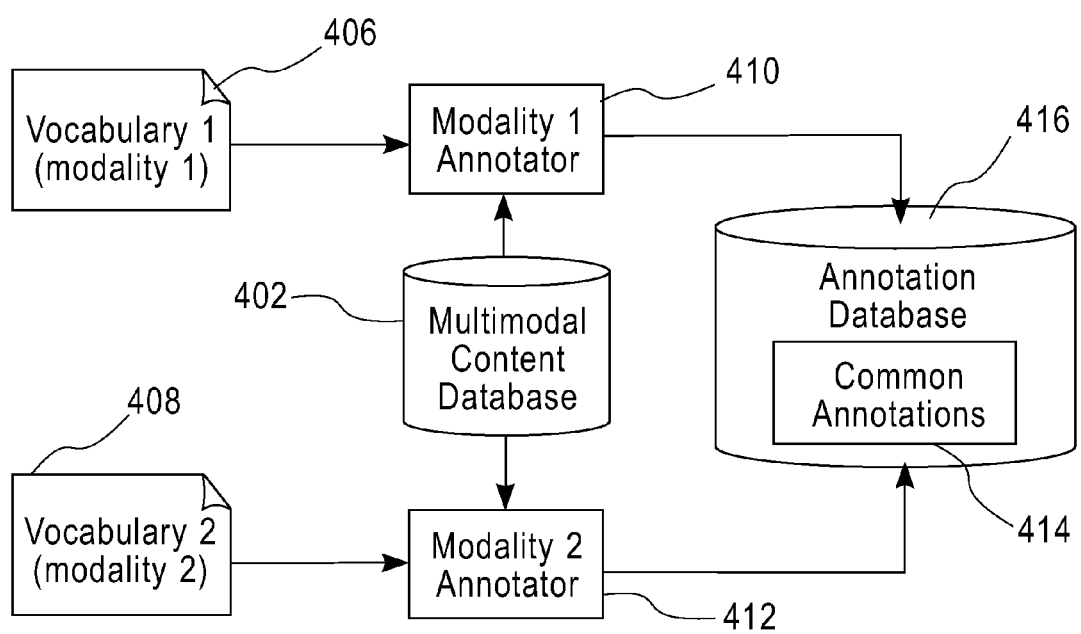
FIG. 4 is a block diagram illustrating a dataflow when an annotation device generates a common annotation for multimodal content in accordance with an illustrative embodiment.

Turning now to FIG. 4, a block diagram illustrating a dataflow when an annotation device generates a common annotation for multimodal content is depicted in accordance with an illustrative embodiment. Network data processing system 400 is a computer system, such as network data processing system 100 in FIG. 1. Network data processing system 400 may optionally be connected to a network, such as network 102 in FIG. 1. However, network data processing system 400 is not required to be connected to a network. In other words, the illustrative embodiments may be implemented in a computing device that is not connected to a network.

In this example, content associated with two or more modalities are present in multimodal content database 402. Multimodal content database is a database for storing content for multiple modalities, such as multimodal content database 114 in FIG. 1 and/or multimodal content database 304 in FIG. 3.

Multiple vocabularies, such as, but not limited to, vocabulary 1 406 and vocabulary 2 408, are associated with one or more annotators, such as annotator 1 410 and annotator 2 412. Vocabulary 1 406 and vocabulary 2 408 are vocabularies in a set of vocabularies, such as set of vocabularies 308 in FIG. 3.

Each vocabulary, such as vocabulary 1 406 and vocabulary 2 408, is defined and associated with a different modality. In this example, vocabulary 1 406 is associated with modality 1 and vocabulary 2 408 is associated with modality 2. Modality 1 and modality 2 are different modalities. For example, modality 1 may be a modality for graphics or images while modality 2 may be a modality for sound or audio content. In this example, a first vocabulary is defined for content in a text modality and an additional different vocabulary is defined for each different modality of the corpus of multimodal content. Thus, if the multimodal content includes text, graphic, and audio modalities, annotator 406 would define a text vocabulary, a vocabulary for the graphic modality, and a vocabulary for the audio modality.

In this example, annotator 406 defines the vocabulary. However, in accordance with the illustrative embodiments, any user and/or computer component capable of defining a vocabulary may define one or more vocabularies. For example, a vocabulary in accordance with the illustrative embodiments may be defined by annotator 406, by a system designer, programmer, or administrator, and/or an end-user.

Annotator 1 410 and annotator 2 412 are software components for annotating content, such as multimodal content in multimodal content database 402. Annotator 1 410 and annotator 2 412 generates common annotation 410 across vocabularies 406 and 408 on a common corpus of multimodal content.

Common annotations 414 are annotations associated with content spanning two or more different modalities. Common annotations 414 are stored in annotation database 416. Annotation database 416 is any type of data storage device for storing annotations, such as, but not limited to, annotation database 312 in FIG. 3.

In this example, annotation database 416 and multimodal content database 402 are depicted as separate components. However, in another illustrative embodiment, annotation database 416 and multimodal content database 402 are implemented in a single database component.

Figure 5:
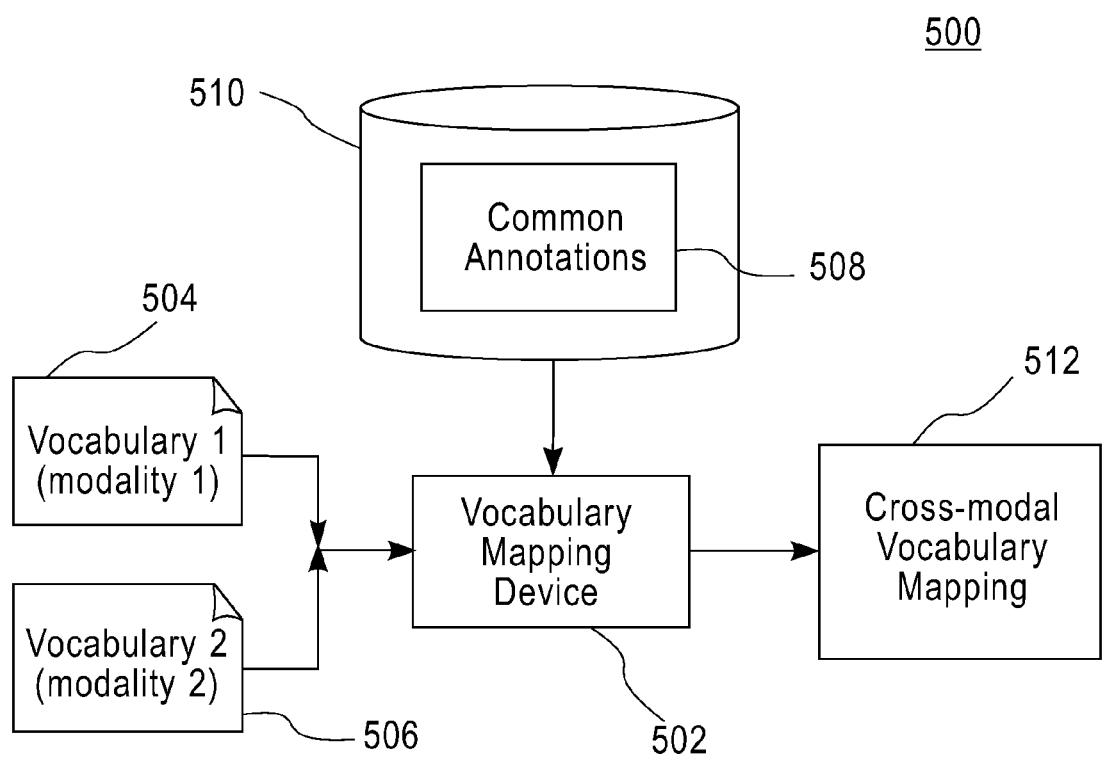
FIG. 5 is a block diagram illustrating a dataflow when a vocabulary mapping device creates a cross-modal vocabulary mapping in accordance with an illustrative embodiment.

FIG. 5 is a block diagram illustrating a dataflow when a vocabulary mapping device creates a cross-modal vocabulary mapping in accordance with an illustrative embodiment. Network data processing system 500 is a computer system, such as network data processing system 100 in FIG. 1. Network data processing system 500 may optionally be connected to a network, such as network 102 in FIG. 1. However, network data processing system 500 is not required to be connected to a network.

Vocabulary mapping device 502 is a software component for learning cross-modal vocabulary mapping, such as vocabulary mapping device 314 in FIG. 3. Vocabulary 1 504 and vocabulary 2 506 are vocabularies in a set of vocabularies associated with a common corpus of multimodal content, such as set of vocabularies 308 in FIG. 3. Vocabulary 1 504 and vocabulary 2 506 are associated with different modalities. In this example, vocabulary 1 504 is associated with modality 1 and vocabulary 2 506 is associated with modality 2.

Common annotations 508 is a set of the annotations from the plurality of vocabularies associated with the common corpus of multimodal content. In this example, common annotations 508 are annotations from vocabulary 1 504 and vocabulary 2 506. Vocabulary mapping device 502 generates cross-modal vocabulary mapping 512 for a plurality of relationships between annotations in common annotations 508. Common annotations 508 are stored in annotation database 510. Annotation database 510 is a database for storing annotations, such as annotation database 416 in FIG. 4.

Cross-modal vocabulary mapping 512 is a map of relationships between one or more annotations associated with a vocabulary of items in one modality to annotations associated with a vocabulary of items in a different modality. The mapping relationship associates one or more annotations or other markers associated with an item in one vocabulary from a first modality to one or more annotations or metadata markers associated with items from a second vocabulary of a second modality. Cross-modal vocabulary mapping 512 includes a plurality of relationships between a plurality of vocabularies, including, but not limited to, ontology relationships, lexical relationships, co-occurrence relationships, equivalence relationships, and semantic relatedness. Cross-modal vocabulary mapping 512 may specify a mapping that links an item in one vocabulary to an item in a different vocabulary in a one-to-one relationship. Cross-modal vocabulary mapping 512 may also specify a link between items in which an item from the first vocabulary includes or comprises one or more items from a different vocabulary.

Figure 6:
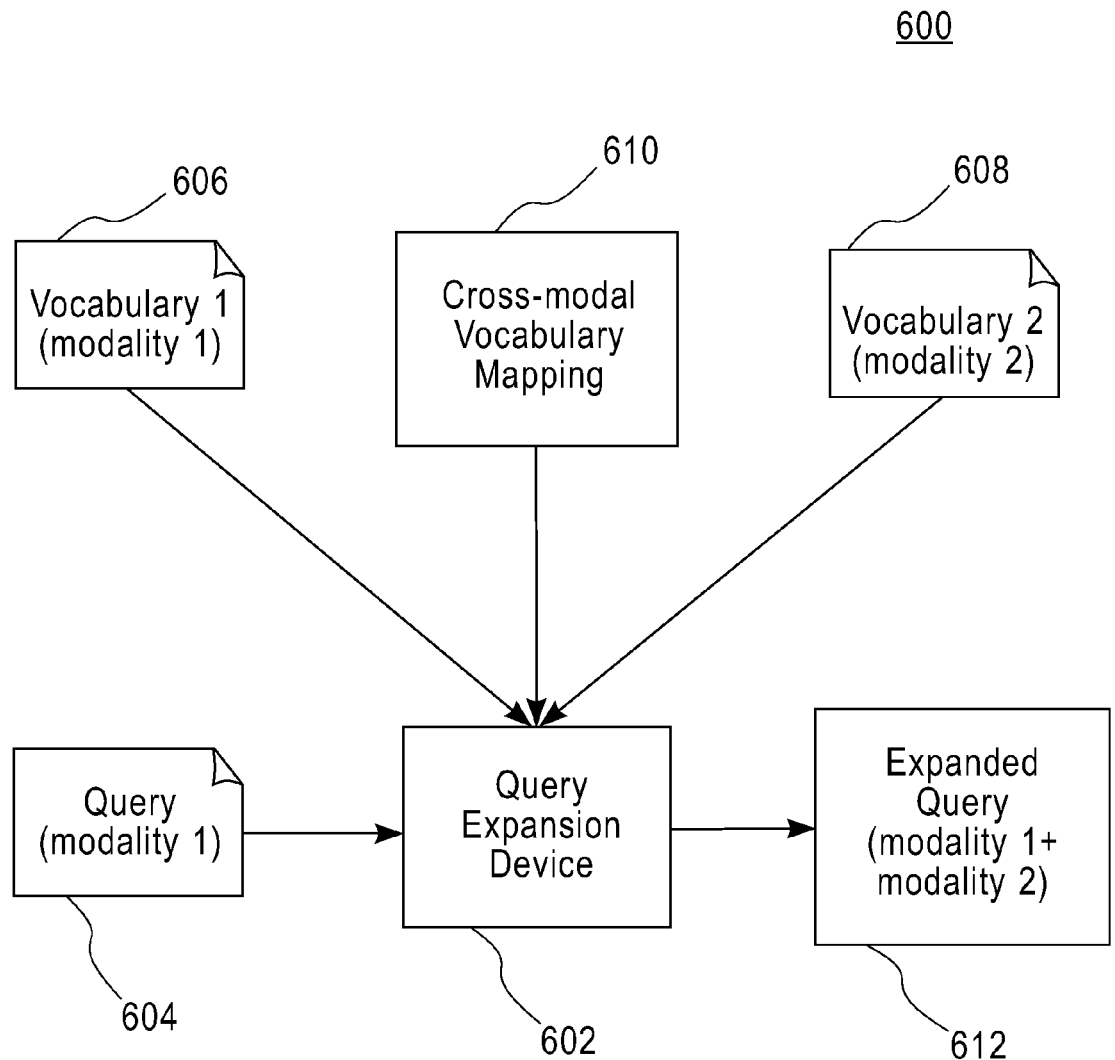
FIG. 6 is a block diagram illustrating a dataflow when a query expansion device generates a refined query in accordance with an illustrative embodiment.

The learning of the mapping relationships is based on common annotations 508. Once common annotations 508 are available, vocabulary mapping device 502 may use statistical machine learning and/or correlation learning techniques to generate cross-modal vocabulary mapping 512. For example, common annotations 508 may act or function as a bridge or intermediate vocabulary annotations to assist vocabulary mapping in correlating two or more vocabularies Referring now to FIG. 6, a block diagram illustrating a dataflow when a query expansion device generates a refined query is shown in accordance with an illustrative embodiment. Network data processing system 600 is a computer system, such as network data processing system 100 in FIG. 1. Network data processing system 600 may optionally be connected to a network, such as network 102 in FIG. 1. However, network data processing system 600 is not required to be connected to a network.

Query expansion device 602 is a software component for expanding a query or a set of terms provided in one vocabulary and its corresponding modality into a refined query term set which includes mapped entities from a different vocabulary associated with a different modality. Query expansion device 602 may be device for expanding a query, such as query expansion device 316 in FIG. 3.

Query 604 is a query generated by a user requesting an action in regard to content associated with a single modality. In this example, query 604 is a request to search and retrieve content responsive to search terms and/or keywords for a first modality. Query 604 is a query, such as query 302 in FIG. 3.

Vocabulary 1 606 and vocabulary 2 608 are vocabularies in a set of vocabularies associated with a common corpus of multimodal content, such as set of vocabularies 308 in FIG. 3. Vocabulary 1 606 and vocabulary 2 608 are associated with different modalities. In this example, vocabulary 1 606 is associated with modality 1 and vocabulary 2 608 is associated with modality 2.

Cross-modal vocabulary mapping 610 is a map of relationships between one or more annotations associated with a vocabulary of items in one modality to annotations associated with a vocabulary of items in a different modality, such as cross-modal vocabulary mapping 512 in FIG. 5.

Query expansion device 602 uses cross-modal vocabulary mapping 610 to map items from vocabulary 1 606 to items in vocabulary 2 608. Query expansion device 602 also uses cross-modal vocabulary mapping 610 to map items in vocabulary 2 608 to items in vocabulary 1 606.

In this example, query expansion device 602 identifies a vocabulary associated with a modality of query 604. In this example, query 604 is a query for modality 1 and vocabulary 1 606 is a vocabulary identified as a vocabulary associated with modality 1. Query expansion device 602 identifies items in vocabulary 1 606 associated with modality 1 that are present in query 604. Query expansion device 602 then identifies items in vocabulary 2 that are mapped to the identified items in vocabulary 1 606 that are present in query 604. The items in vocabulary 2 608 mapped to items in query 604 are added to query 604 to form expanded query 612. Expanded query 612 can be used to search for content responsive to the user's request in modality 1 and modality 2 simultaneously.

In this example, query expansion device 602 expands query 604 to include items from only two different vocabularies associated with only two modalities. However, in accordance with the illustrative embodiments, query 604 may be expanded to include terms, keywords, items, and/or annotations from any number of different vocabularies associated with any number of different modalities.

Figure 7:
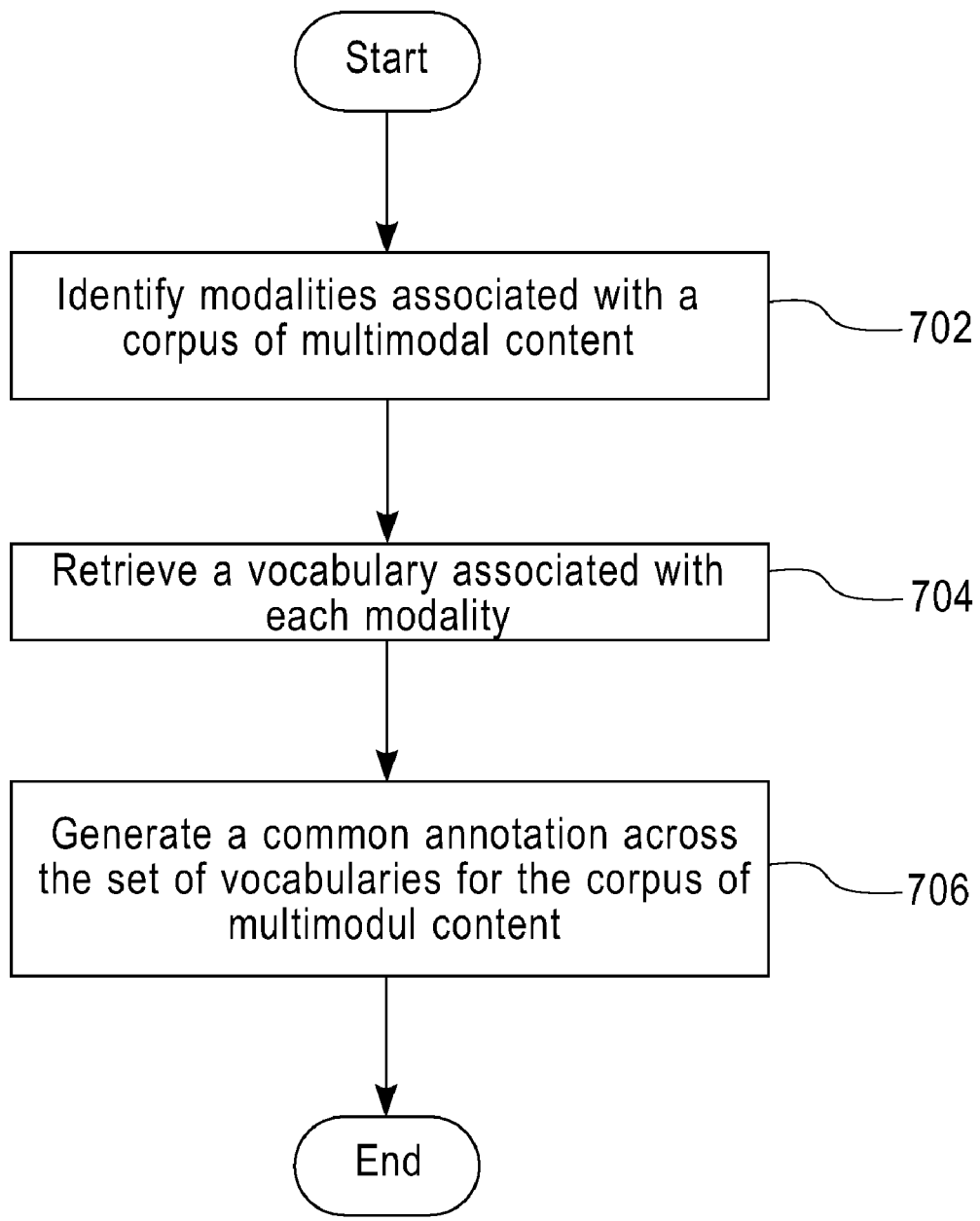
FIG. 7 is a flowchart illustrating a process for annotating multimodal content in accordance with an illustrative embodiment.

FIG. 7 is a flowchart illustrating a process for annotating multimodal content in accordance with an illustrative embodiment. In this illustrative example shown in FIG. 7, process 700 is performed by a software component for annotating multimodal content, such as annotator 306 in FIG. 3 and/or annotator 410 in FIG. 4.

The process begins by identifying two or more modalities associated with a corpus of multimodal content (step 702). A modality may include a text modality, a video/graphics type modality, and/or a sound/audio type of modality. The vocabulary for each type of modality forms a set of vocabularies. The process retrieves a vocabulary associated with each type of modality (step 704). The process then generates common annotations across the set of vocabularies for the corpus of multimodal content (step 706) with the process terminating thereafter.

Figure 8:
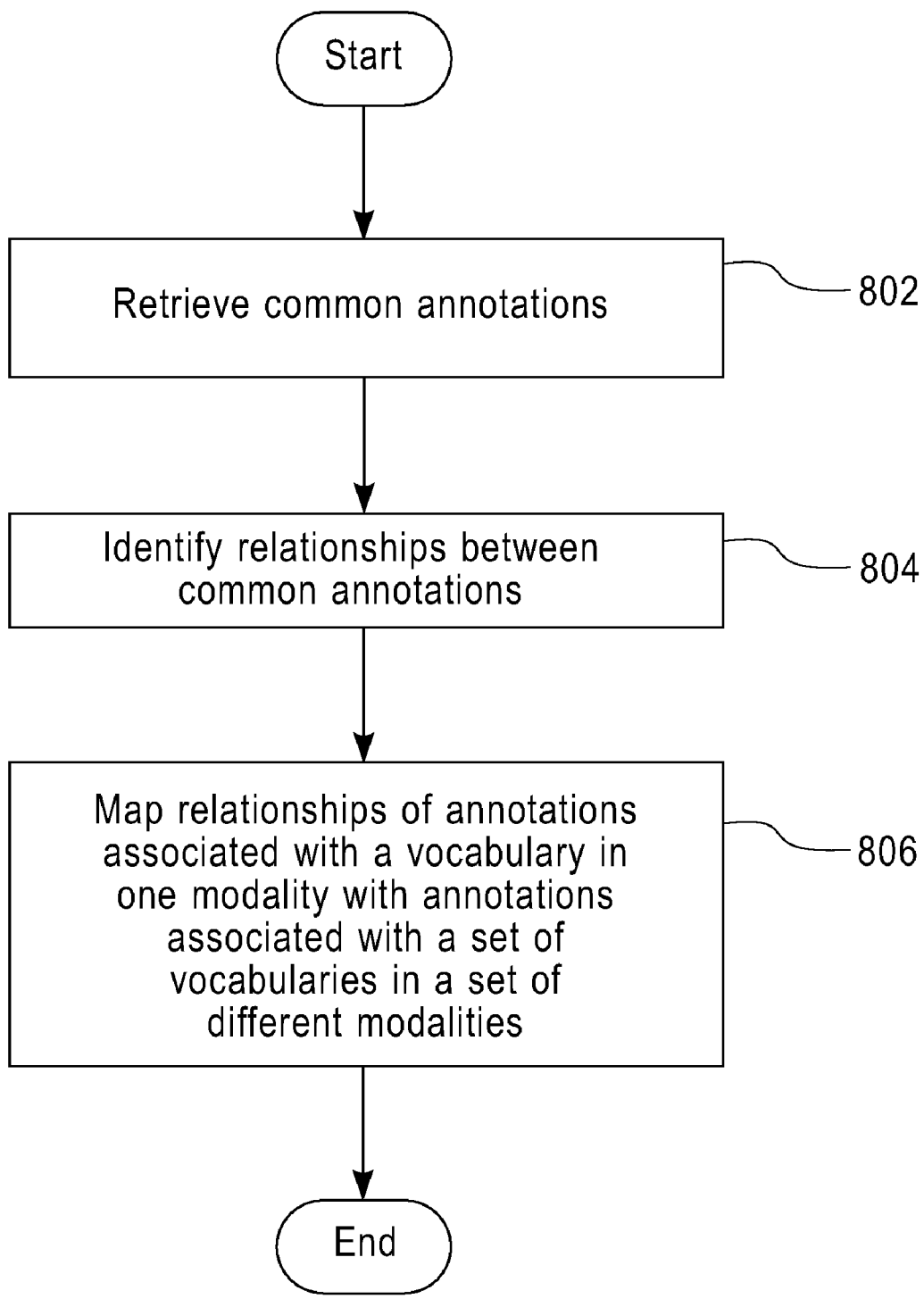
FIG. 8 is a flowchart illustrating a process for cross-modal vocabulary mapping in accordance with an illustrative embodiment.

Referring now to FIG. 8, a flowchart illustrating a process for cross-modal vocabulary mapping is depicted in accordance with an illustrative embodiment. In this illustrative example shown in FIG. 8, the process is performed by a hardware and/or software component for mapping cross-modal vocabularies, such as vocabulary mapping device 314 in FIG. 3 and/or vocabulary mapping device 502 in FIG. 5.

The process begins by retrieving common annotations across a set of vocabularies associated with a common corpus of multimodal content (step 802). The process identifies relationships between annotations in the common annotations (step 804). The process maps the identified relationships of annotations associated with a vocabulary for a vocabulary in one modality with annotations associated with one or more vocabularies in one or more different modalities to form a cross-modal vocabulary mapping, such as cross-modal vocabulary mapping 512 in FIG. 5 (step 806) with the process terminating thereafter.

Figure 9:
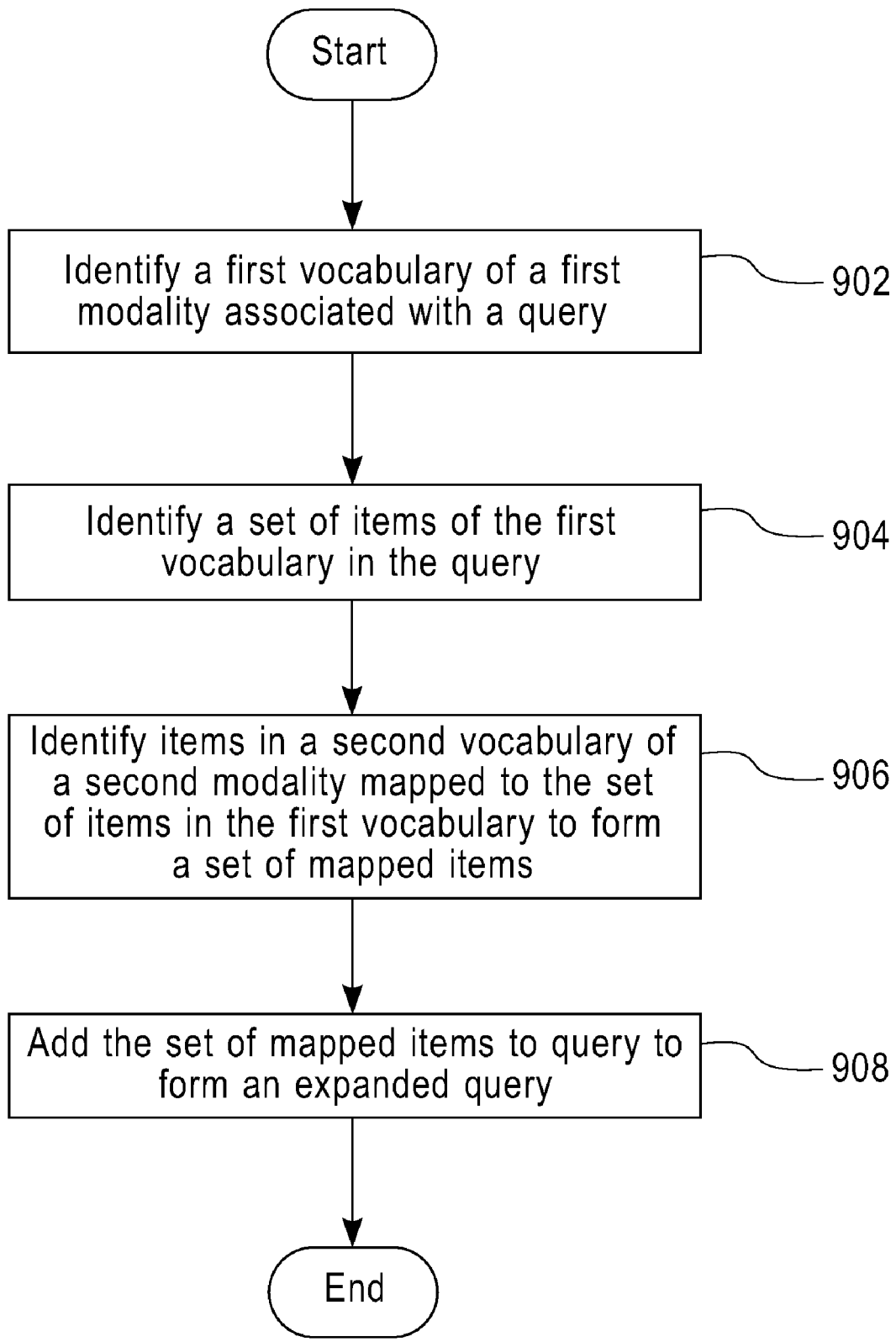
FIG. 9 is a flowchart illustrating a process for generating a refined query in accordance with an illustrative embodiment.

FIG. 9 is a flowchart illustrating a process for generating a refined query in accordance with an illustrative embodiment. In this illustrative example shown in FIG. 9, the process is performed by a software component for generating an expanded query, such as query expansion device 316 in FIG. 3 and/or query expansion device 602 of FIG. 6.

The process begins by identifying a first vocabulary of a first modality associated with a query (step 902). The process identifies a set of items of the first vocabulary included in the query (step 904). The process identifies items in a second vocabulary of a second modality mapped to the set of items in the first vocabulary included in the query to form a set of mapped items (step 906). The set of mapped items may include one or more mapped items. The process adds the set of mapped items to the query to form an expanded query (step 908) with the process terminating thereafter.

The illustrative embodiments provide a computer implemented method, apparatus, and computer usable program code for multimodal cross-vocabulary mapping. In one embodiment, a corpus of multimodal content is annotated simultaneously using annotations from a plurality of vocabularies to form a set of common annotations. Relationships between a first vocabulary associated with a first modality and a second vocabulary associated with a second modality are identified using the set of common annotations to form a multimodal vocabulary mapping. Items in the first vocabulary associated with the first modality are mapped to items in the second vocabulary associated with the second modality using the multimodal vocabulary mapping.

Thus, the illustrative embodiments provide a cross-modal, cross-vocabulary mapping that can facilitate unstructured content, search and retrieval of multimodal content, and/or information management. The embodiments provide an ability to search one modality, such as video or audio content, using query terms from a vocabulary associated with another modality, such as a text modality. The cross-modal vocabulary mapping of the illustrative examples may be used for searching, categorizing, annotating, summarizing, browsing, presenting, filtering, routing, accessing, and/or distributing multimodal content.

The flowchart and block diagrams in the figures illustrate the architecture, functionality, and operation of possible implementations of systems, methods and computer program products according to various embodiments. In this regard, each step in the flowchart or each block in the block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for multimodal cross-vocabulary mapping, the computer implemented method comprising:

annotating a corpus of multimodal content simultaneously using annotations from a plurality of vocabularies to form a set of common annotations;

identifying relationships between a first vocabulary associated with a first modality and a second vocabulary associated with a second modality using the set of common annotations to form a multimodal vocabulary mapping; and mapping with a computing device items in the first vocabulary associated with the first modality to items in the second vocabulary associated with the second modality using the multimodal vocabulary mapping.

2. The computer implemented method of claim 1 further comprising:

responsive to receiving a query to search for content that includes query items associated with the first vocabulary, identifying a set of items in the second vocabulary that are mapped to the query items associated with the first vocabulary to form a set of mapped items in a second modality; and adding the set of mapped items in the second modality to the query to form an expanded query, wherein the expanded query can be used to search for content in the first modality and the second modality simultaneously.

3. The computer implemented method of claim 1 wherein each vocabulary in the plurality of vocabularies is associated with a different modality in the corpus of multimodal content, and wherein two or more different modalities are associated with the corpus of multimodal content.

4. The computer implemented method of claim 3 wherein a modality is selected from a group consisting of a text modality, a graphical modality, and an audio modality.

5. The computer implemented method of claim 1 wherein the relationships between the first vocabulary associated with the first modality and the second vocabulary associated with the second modality are relationships selected from a group consisting of equivalence relationships, ontological relationships, lexical relationships, statistical relationships, and semantic association relationships.

6. The computer implemented method of claim 1 wherein a part of the set of common annotations is extracted automatically without human intervention.

7. The computer implemented method of claim 1 wherein the multimodal vocabulary mapping is generated using a test selected from a group consisting of a statistical independence test, a significance test, and a co-occurrence measurement test between items in the first vocabulary and the second vocabulary.

8. The computer implemented method of claim 1 further comprising:
performing a search for multimodal content in the corpus of multimodal content using the cross-modal vocabulary mapping.

9. The computer implemented method of claim 1 further comprising:
performing a content filtering of multimodal content in the corpus of multimodal content using the cross-modal vocabulary mapping.

10. The computer implemented method of claim 1 further comprising:
routing multimodal content in the corpus of multimodal content using the cross-modal vocabulary mapping.

11. The computer implemented method of claim 1 further comprising:
performing multimodal concept detection associated with the corpus of multimodal content using the cross-modal vocabulary mapping.

12. The computer implemented method of claim 1 further comprising:
summarizing multimodal content using the cross-modal vocabulary mapping.

13. The computer implemented method of claim 1 further comprising:
performing multimodal content translation using the cross-modal vocabulary mapping.

14. A computer program product comprising:
a non-transitory computer-readable medium including computer usable program code for multimodal cross-vocabulary mapping, said computer program product comprising:
computer usable program code for annotating a corpus of multimodal content simultaneously using annotations from a plurality of vocabularies to form a set of common annotations;
computer usable program code for identifying relationships between a first vocabulary associated with a first modality and a second vocabulary associated with a second modality using the set of common annotations to form a multimodal vocabulary mapping; and
computer usable program code for mapping items in the first vocabulary associated with the first modality to items in the second vocabulary associated with the second modality using the multimodal vocabulary mapping.

15. The computer program product of claim 14 further comprising:
computer usable program code for identifying a set of items in the second vocabulary that are mapped to a query items associated with the first vocabulary to form a set of mapped items in a second modality in response to receiving the query to search for content that includes query items associated with the first vocabulary; and
computer usable program code for adding the set of mapped items in the second modality to the query to form an expanded query, wherein the expanded query can be used to search for content in the first modality and the second modality simultaneously.

16. An apparatus comprising:
a bus system;
a communications system connected to the bus system;
a memory connected to the bus system, wherein the memory includes computer usable program code; and
a processing unit connected to the bus system, wherein the processing unit executes the computer usable program code to annotate a corpus of multimodal content simultaneously using annotations from a plurality of vocabularies to form a set of common annotations; identify relationships between a first vocabulary associated with a first modality and a second vocabulary associated with a second modality using the set of common annotations to form a multimodal vocabulary mapping; and map items in the first vocabulary associated with the first modality to items in the second vocabulary associated with the second modality using the multimodal vocabulary mapping.

17. The apparatus of claim 16 wherein the processor unit further executes the computer usable program code to identify a set of items in the second vocabulary that are mapped to query items associated with the first vocabulary to form a set of mapped items in a second modality in response to receiving a query to search for content that includes the query items associated with the first vocabulary and add the set of mapped items in the second modality to the query to form an expanded query, wherein the expanded query can be used to search for content in the first modality and the second modality simultaneously.

18. An annotation system for multimodal cross-vocabulary mapping, the system comprising:
a set of annotators, wherein the set of annotators annotates a corpus of multimodal content simultaneously using annotations from a plurality of vocabularies to form a set of common annotations; and
a vocabulary mapping device, wherein the vocabulary mapping device identifies relationships between a first vocabulary associated with a first modality and a second vocabulary associated with a second modality using the set of common annotations to form a multimodal vocabulary mapping and maps items in the first vocabulary associated with the first modality to items in the second vocabulary associated with the second modality using the multimodal vocabulary mapping.

19. The annotation system of claim 18 further comprising:
a query expansion device, wherein the query expansion device identifies a set of items in the second vocabulary that are mapped to query items associated with the first vocabulary to form a set of mapped items in a second modality, in response to receiving a query to search for content that includes the query items associated with the first vocabulary, and wherein the query expansion device adds the set of mapped items in the second modality to the query to form an expanded query, wherein the expanded query can be used to search for content in the first modality and the second modality simultaneously.

20. The annotation system of claim 18 further comprising: a multimodal content database, wherein the multimodal content database stores a corpus of multimodal content.

* * * * *